(12) United States Patent
Stadtfeld et al.

(10) Patent No.: US 9,782,848 B2
(45) Date of Patent: Oct. 10, 2017

(54) SWING MOTION FOR MANUFACTURING NON-GENERATED BEVEL GEARS WITH END RELIEF

(71) Applicant: THE GLEASON WORKS, Rochester, NY (US)

(72) Inventors: Hermann J. Stadtfeld, Webster, NY (US); Robert T. Donnan, Macedon, NY (US)

(73) Assignee: THE GLEASON WORKS, Rochester, NY (US)

( * ) Notice: Subject to any disclaimer, the term of this patent is extended or adjusted under 35 U.S.C. 154(b) by 55 days.

(21) Appl. No.: 14/890,482

(22) PCT Filed: May 29, 2014

(86) PCT No.: PCT/US2014/039972
§ 371 (c)(1),
(2) Date: Nov. 11, 2015

(87) PCT Pub. No.: WO2014/194057
PCT Pub. Date: Dec. 4, 2014

(65) Prior Publication Data
US 2016/0089735 A1 Mar. 31, 2016

Related U.S. Application Data

(60) Provisional application No. 61/828,720, filed on May 30, 2013.

(51) Int. Cl.
*B23F 19/00* (2006.01)
*B23F 9/10* (2006.01)
*B23F 19/10* (2006.01)
*B23F 9/02* (2006.01)

(52) U.S. Cl.
CPC ............ *B23F 19/005* (2013.01); *B23F 9/025* (2013.01); *B23F 9/10* (2013.01); *B23F 9/105* (2013.01); *B23F 19/10* (2013.01); *B23F 19/102* (2013.01)

(58) Field of Classification Search
CPC .. B23F 9/025; B23F 9/10; B23F 9/105; B23F 19/005; B23F 19/10; B23F 19/102
See application file for complete search history.

(56) References Cited

U.S. PATENT DOCUMENTS 2,274,761 A * 3/1942 Wildhaber ................ B23F 1/08
407/21
2,324,182 A * 7/1943 Wildhaber ................ B23F 9/10
409/44

(Continued)

OTHER PUBLICATIONS

Müller, H., "Local 3-D Flank Form Optimizations for Bevel Gears", Gear Technology, Sep.-Oct. 2003, pp. 54-58.

(Continued)

*Primary Examiner* — Timothy V Eley
(74) *Attorney, Agent, or Firm* — Robert L. McDowell

(57) ABSTRACT

A motion which creates an end relief and which is integrated into the plunging cycle of non-generated bevel gears. The tool, after feeding to the correct tooth forming position in case of non-generated gears, is swung sideways out of cutting or grinding contact with the slot instead of along a withdraw path which is identical to the plunge path but opposite in direction.

9 Claims, 11 Drawing Sheets

(56) References Cited

U.S. PATENT DOCUMENTS

| | | | | |
|---|---|---|---|---|
| 2,772,602 | A * | 12/1956 | Christman | B23F 19/102 |
| | | | | 407/21 |
| 4,799,337 | A * | 1/1989 | Kotthaus | B23F 17/001 |
| | | | | 409/26 |
| 5,114,287 | A | 5/1992 | Ervay et al. | |
| 5,255,475 | A * | 10/1993 | Kotthaus | B23F 17/001 |
| | | | | 451/548 |
| 5,662,438 | A | 9/1997 | Wiener et al. | |
| 5,800,103 | A * | 9/1998 | Stadtfeld | B23F 9/025 |
| | | | | 409/26 |
| 6,939,093 | B2 * | 9/2005 | Arvin | B23F 19/104 |
| | | | | 407/23 |
| 7,377,731 | B1 * | 5/2008 | Arvin | B23F 19/12 |
| | | | | 409/11 |
| 9,033,625 | B2 * | 5/2015 | Stadtfeld | B23F 9/025 |
| | | | | 409/39 |

OTHER PUBLICATIONS

Türich, A., "Producing Profile and Lead Modifications in Threaded Wheel and Profile Grinding", Gear Technology, Jan.-Feb. 2010, pp. 54-62.
Krenzer, T., "CNC Bevel Gear Generators and Flared Cup Gear Grinding", Gear Technology, Jul.-Aug. 1993, pp. 18-24.
International Search Report and Written Opinion for PCT/US2014/039972, ISA/EPO, Feb. 4, 2015, 13 pages.

* cited by examiner

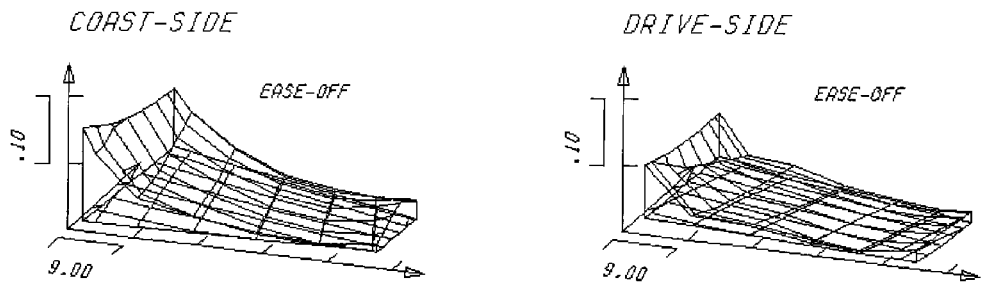

Figure 12d

```
G L E A S O N   R&D   DATE 05-23-13     TIME 11:18:02
PINION GRINDING SUMMARY No. Example for 0.1mm End-Relief, Drive Side

FORMATE HEEL ENDREM SWING MOTIONS

56. HEEL START SWING POSITION. . . . . . . .   -110.042    deg
    58. HEEL END SWING POSITION. . . . . . . .    -102.045    deg
    59. START SWING RATE . . . . . . . . . . .      25.000 deg/sec
    69. X-AXIS WITHDRAW ANGLE. . . . . . . . .     335.149    deg
    70. Z-AXIS WITHDRAW ANGLE. . . . . . . . .       7.035    deg
   ER2. ENDREM SETOVER . . . . . . . . . . . .    [__.___]     mm ER1. MODIFIED WORK ROTATION  - 1st ORDER . .      .00000 rad/rad
   ER2. MODIFIED WORK ROTATION  - 2nd ORDER . .    -6.39033 rad/rad^2
   ER3. MODIFIED WORK ROTATION  - 3rd ORDER . .      .00000 rad/rad^3

ER5. VERTICAL MOTION  - 1st ORDER. . . . . .      .00000   mm/rad
   ER6. VERTICAL MOTION  - 2nd ORDER. . . . . .  -220.70230   mm/rad^2
   ER7. VERTICAL MOTION  - 3rd ORDER. . . . . .      .00000   mm/rad^3

ER9.  HORIZONTAL MOTION - 1st ORDER. . . . .      .00000   mm/rad
   ER10. HORIZONTAL MOTION - 2nd ORDER. . . . .   831.13710   mm/rad^2
   ER11. HORIZONTAL MOTION - 3rd ORDER. . . . .      .00000   mm/rad^3

ER13. WORK AXIAL MOTION - 1st ORDER. . . . .      .00000   mm/rad
   ER14. WORK AXIAL MOTION - 2nd ORDER. . . . .   557.28110   mm/rad^2
   ER15. WORK AXIAL MOTION - 3rd ORDER. . . . .      .00000   mm/rad^3

ER17. ROOT ANGLE MOTION - 1st ORDER. . . . .      .00000  rad/rad
   ER18. ROOT ANGLE MOTION - 2nd ORDER. . . . .    -2.48512  rad/rad^2
   ER19. ROOT ANGLE MOTION - 3rd ORDER. . . . .      .00000  rad/rad^3

RELEASED BY - HJS
```

Figure 13

SWING MOTION FOR MANUFACTURING NON-GENERATED BEVEL GEARS WITH END RELIEF

FIELD OF THE INVENTION

The invention is directed to the manufacture of bevel gears and in particular to a method of providing end relief to gear teeth as part of the manufacturing process.

BACKGROUND OF THE INVENTION

Manufacturing of spiral bevel and hypoid gears may be conducted according to the methods which include the following:

A. Continuous indexing face hobbing with a circular face cutter, which rotates while the work also rotates such that consecutive blade groups move through consecutive slots. The cutter rotates, in addition to the rotation around its center, around the axis of a theoretical generating gear (i.e. the generating roll). The correct tooth is formed if the work also rotates with the correct ratio in order to stay in mesh with the theoretical generating gear (generated bevel gear).

B. Continuous indexing face hobbing with a circular face cutter, which rotates while the work also rotates without any generating roll motion. The cutter represents one tooth of the negative image of the work (non-generated bevel gear). This process is usually applied to ring gears which are mated with pinions that have been manufactured using a generating gear which is identical to the ring gear.

C. Single indexing face milling, with a circular face cutter, which rotates while the work is not performing any indexing motion. The cutter represents one tooth of the generating gear which, in addition to its rotation around its axis, rotates around the theoretical generating gear axis (i.e. the generating roll). The correct tooth is formed if the work also rotates with the correct ratio in order to stay in mesh with the virtual generating gear (generated bevel gear).

D. Single indexing face milling, with a circular face cutter, which rotates while the work is not performing any indexing motion. The cutter represents one tooth of the negative image of the work (non-generated bevel gear). This process is usually applied to ring gears which are mated with pinions that have been manufactured using a generating gear which is identical to the ring gear.

Methods B and D are fast because the time for the generating motion is saved. As a result, the tooth form has no involute shape in profile and also is not wound around the pitch cone. Although the tooth form of the mating member accounts for the special, simplistic shape of the non-generated bevel gear, flank form corrections in tooth length direction have been very difficult or even impossible.

One flank form correction type which is necessary in order to allow a very conjugate flank center (achieved by little or no crowning in tooth profile direction and the tooth length direction) is the border relief (or end relief).

In the profile direction it is common to apply a protuberance to the cutting blades of both mating members which will provide an ease-off strip in the transition zones between the tooth flanks and root fillets. This correction type can be applied to methods A, B, C and D.

End relief in the face width direction is preferred to begin parallel to the toe (inside) or heel (outside) tooth border (or perpendicular to the pitch line or root line). Generating processes can only influence the tooth form (and therefore any kind of relief) beginning at a line which is parallel to the generating marks but which is oriented at an angle with respect to the pitch line of a tooth. This angle varies with the spiral angle and is in most common cases below 45 degrees. Therefore, the desired end relief cannot be achieved with generating processes.

In the tooth length direction (face width), a special cutter head design in connection with a special machine movement is known for Method D. The different blade groups in the cutter head had to be assembled with different blade stick outs and when the last blade for the convex flank entered the slot at the toe end, the cutter spindle had to perform a fast axial move in order to remove, in a region of 3 to 6 mm from the toe border in tooth length direction, more material than in the remaining slot. Slot roughing had to be done in a separate step with a conventional cutter head on a conventional machine. The finishing was done on a machine with a very slow rotating cutter spindle (with the described axial motion) in one cutter revolution per slot (broaching process). The spaces between the last finishing blades and the preceding blades had to be larger than the face width of the gear in order to avoid cutting action of other blades during the corrective axial motion occurred.

In today's high speed cutting of bevel gears, method D is no longer used. Surface speeds of coated carbide cutters are more than 10-times faster than the "broaching" process which would require axial cutter movements between 5 and 15 Hz, versus 0.5 Hz in the broaching process. Such a high frequency is difficult to realize and would cause significant dynamic process disturbances which reduce the tool life and lead to poor part quality. Also, a cutter head with blade spacing larger than the parts face width would not be very productive.

When the broaching process was applied for bevel gear cutting, the hard finishing operation for face milled bevel gears was commonly lapping. The relief allowed lapping the flank centers to be very conjugate while the end relief from the soft cutting operation was still present after the lapping and prevented toe edge contact under high load and deflection in operation. Today, about 75% of all face milled bevel gears are hard finished by grinding. Since a grinding wheel has a rotationally symmetric abrasive surface with continuum of cutting edges (i.e. abrasive grains) which are spaced about at a fractional millimeter distance, the creation of an end relief as described above is physically not possible.

SUMMARY OF THE INVENTION

The invention relates to a motion which creates an end relief and which is integrated into the plunging cycle of non-generated bevel gears. The inventors discovered that the tool, after feeding to the correct final tooth forming position in case of non-generated gears, can be swung sideways out of cutting or grinding contact with the slot instead of along a withdraw path which is identical to the plunge path but opposite in direction.

BRIEF DESCRIPTION OF THE DRAWINGS

FIG. 5b shows a two dimensional top view of tool and work shown in FIG. 5a

FIG. 10b shows a two dimensional top view of tool and work shown in FIG. 10a

FIG. 11b shows a two dimensional top view of tool and work shown in FIG. 11a.

FIG. 12d shows the Ease-Offs of coast and drive side with a 0.1 mm heel end relief on the coast side and a 0.05 mm heel end relief on the drive side FIG. 13 shows an example of additional summary items to effect an end relief swing.

DETAILED DESCRIPTION OF THE PREFERRED EMBODIMENT

Figure 1:
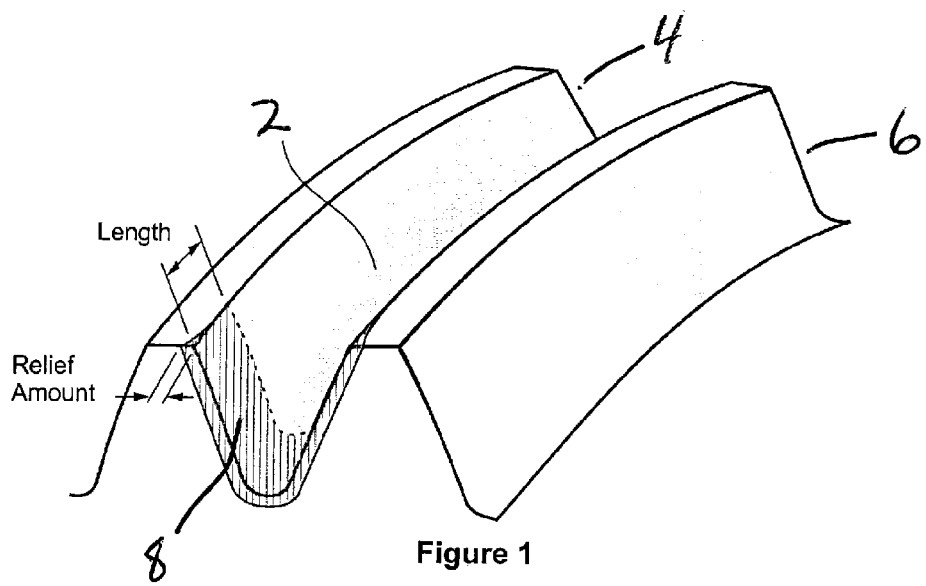
FIG. 1 shows a three dimensional view of a slot surrounded by two teeth. The slot has an end relief section with a certain length and a certain relief amount.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

The invention relates to a motion which creates an end relief and which is preferably integrated into the plunging cycle of non-generated bevel gears. The inventors discovered that the tool after feeding to the correct final tooth forming position in case of non-generated gears could be swung sideways out of cutting or grinding contact with the slot instead of a withdraw path which is identical to the plunge path but moves in the opposite direction. Such a swing motion is preferably conducted around an axis which is determined in three dimensional space to achieve an end relief with a certain width (in face width direction), a certain magnitude of maximal relief, and with a certain function (like relief build up linear, second or higher order relative to the distance from the relief begin). After the side swing, the tool may move via any path which is fast and avoids interference between part and tool in order to prepare for the next slot machining. Since the sideways swing is directly connected to the plunging process and presents the first part of the tool withdrawal, the additional time consumption versus a conventional direct tool withdrawal is minimal.

Additionally, the inventors discovered that the exit swing requires a cutter inclination change around two axes while the cutter center has to rotate around the generating gear axis and the work is required to rotate some amount. Those four rotations are connected to a change of distance between cutter and generating gear center as well as a linear movement of the cutter in direction of the generating gear axis. All four rotations and two linear movements have to be coordinated in a timed relationship. The described rotations and movements for the generation of an end relief are preferably carried out by a generating cycle after the non-generated plunging. The manufacturing data of non-generated gears are commonly referred to as V-H basic settings, consisting of four settings:
 1. V . . . Vertical Setting→Tool center position in X4 direction
 2. H . . . Horizontal Setting→Tool center in Z4 direction
 3. MCCP . . . Machine Center to Crossing Point→Work position along Z1 axis
 4. $\Gamma_M$ . . . Machine Root Angle→Work orientation around X4 axis Generating basic settings usually consist of minimally nine settings:
1. Radial Distance
2. Sliding Base
3. Machine Offset
4. Machine Center to Crossing Point
5. Swivel Angle
6. Tilt Angle
7. Machine Root Angle
8. Center Roll Position
9. Ratio of Roll Combining the two cycle types (i.e. generating and non-generating) is typically thought to be unpractical because it leads to a complex and confusing machine summary and also disrupts the connection between the two types of settings even in case of only small flank form corrections. For example, if a spiral angle correction of 30 minutes was made, then an end relief of 0.15 mm (face width=50 mm) would either disappear or double (depending on the direction of the spiral angle correction).

The usage of the V-H-coordinate system for the calculation of complex correction motions was not possible prior to the invention because of the tendency for some information to be lost in the simpler V-H-settings. For example, the rotational position of the work is lost and the cutter tilt as an angle is expressed in a modified Vertical Setting in connection with a different Machine Root Angle (plus Horizontal and Machine Center to Crossing Point Adjustments).

In the following text, the generating basic settings for non-generated gears are called "form-rolling settings" and the process is called "form-rolling". The V-H settings for non-generated gears are called "non-generated settings" and the process is called "non-generating" in the following explanations. The inventive method is based on the principle that an additional tool infeed based on the tool pressure angles and the feed direction will remove material on one or both flanks (convex and concave). In order to not destroy the flank form in the main flank section, the inventive method rotates the tool around an axis in space which is predetermined such that the tool is fed into the material while moving away from the flank center and also lifting out of the slot portion adjacent to the end relief thereby avoiding any secondary flank contact with the non-relieved flank areas.

FIG. 1 shows a three dimensional view of a tooth slot 2 surrounded by two teeth 4, 6. The slot has an end relief section 8 having a Length and a Relief Amount. The end relief section is created by a tool movement (swing) which positions the tool deeper at the end of the slot.

Figure 2:
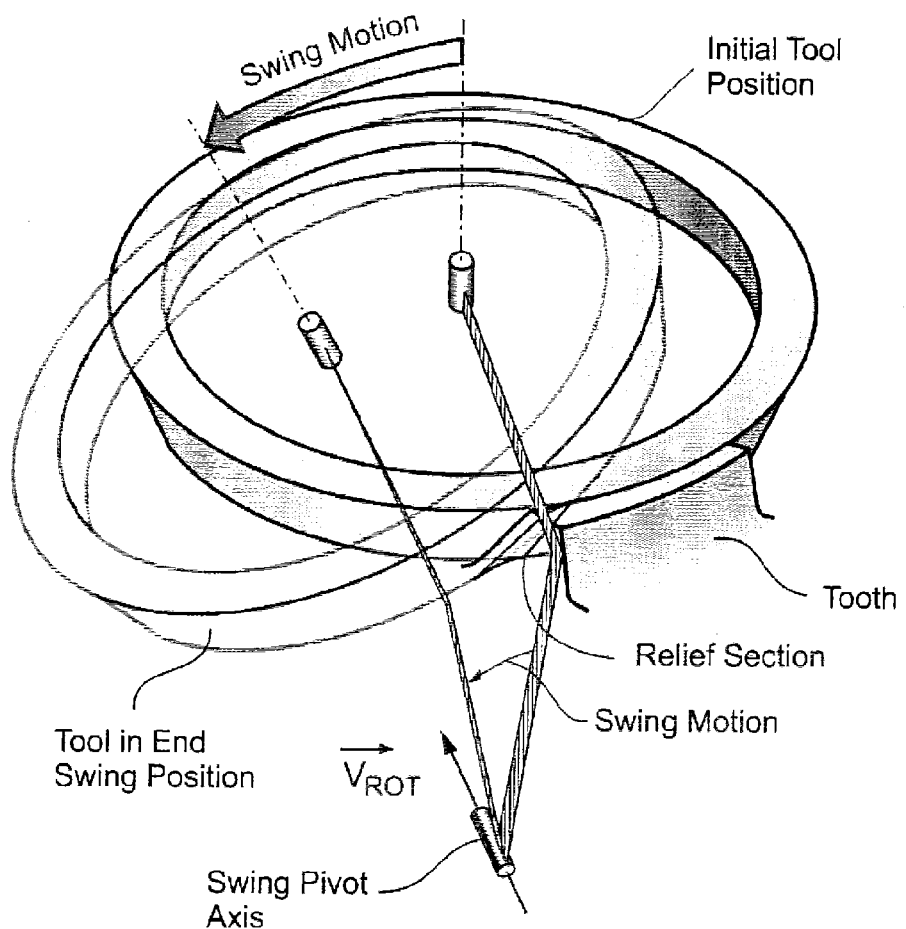
FIG. 2 shows a three dimensional view of a tooth and a partial slot. A schematic cutting or grinding tool is drawn in two different positions which are connected by a move, given by the indicated linkage.

FIG. 2 shows a three dimensional view of a tooth and a partial slot. A schematic cutting or grinding tool is drawn in a first position where it machines and forms the basic flank geometry in a non-generating forming process. The tool is symbolically connected with a linkage to a swing bearing which represents the swing rotation axis. The swing motion rotates the tool such that it lifts away from the main flank area and fabricates an end relief section with a certain length and a certain relief amount. Instead of the linkage connection, three linear and two rotational movements can be coordinated in a machine tool in order to achieve the same swing motion relationship between tool and gear slot.

Figure 3:
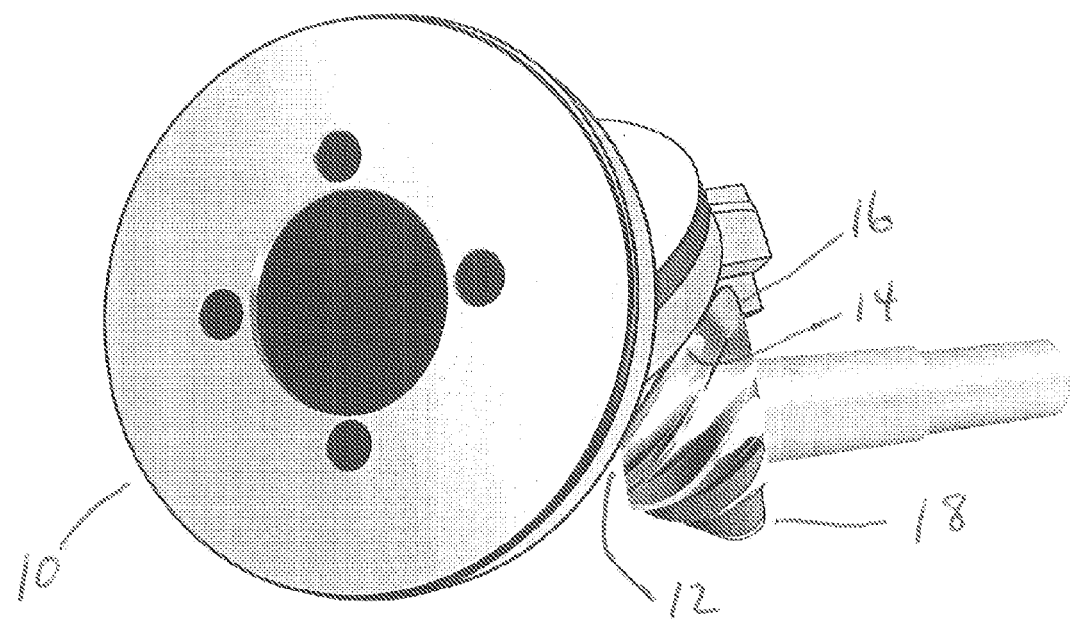
FIG. 3 shows a three dimensional view of a face cutting tool in a toe, center and heel roll position, representing the winding of the tool around the pitch or root cone of the bevel gear.

FIG. 3 shows a three dimensional view of a face cutting tool 10 in a toe roll position 12, center roll position 14 and heel roll position 16 representing the winding of the tool 10 around the pitch or root cone of the bevel gear 18.

Figure 4:
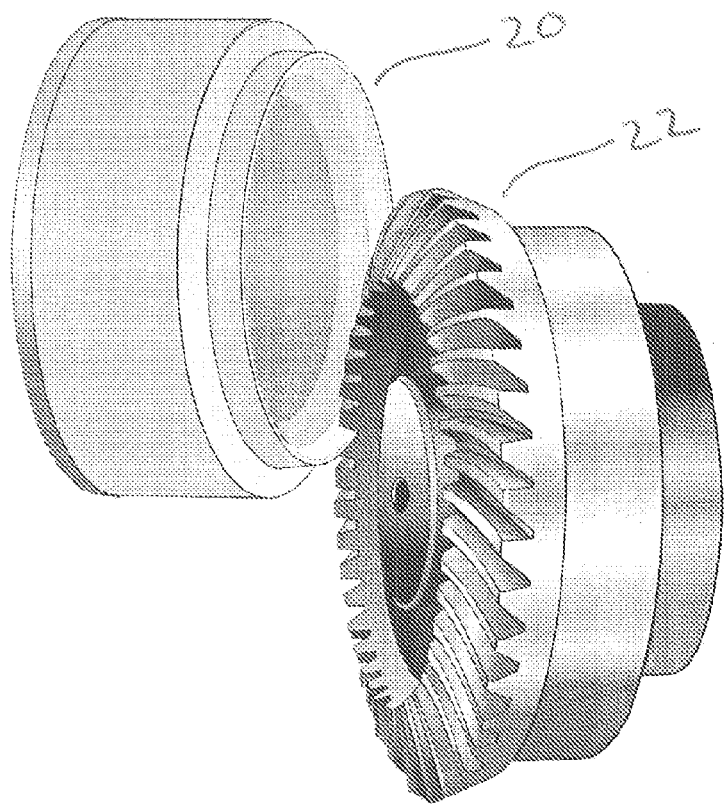
FIG. 4 shows a three dimensional view of a face cutting tool forming the slot of a non-generated gear without rolling or generating motion.

FIG. 4 shows a three dimensional view of a face cutting tool 20 forming a slot of a non-generated gear 22 without rolling or generating motion.

Figure 5A:
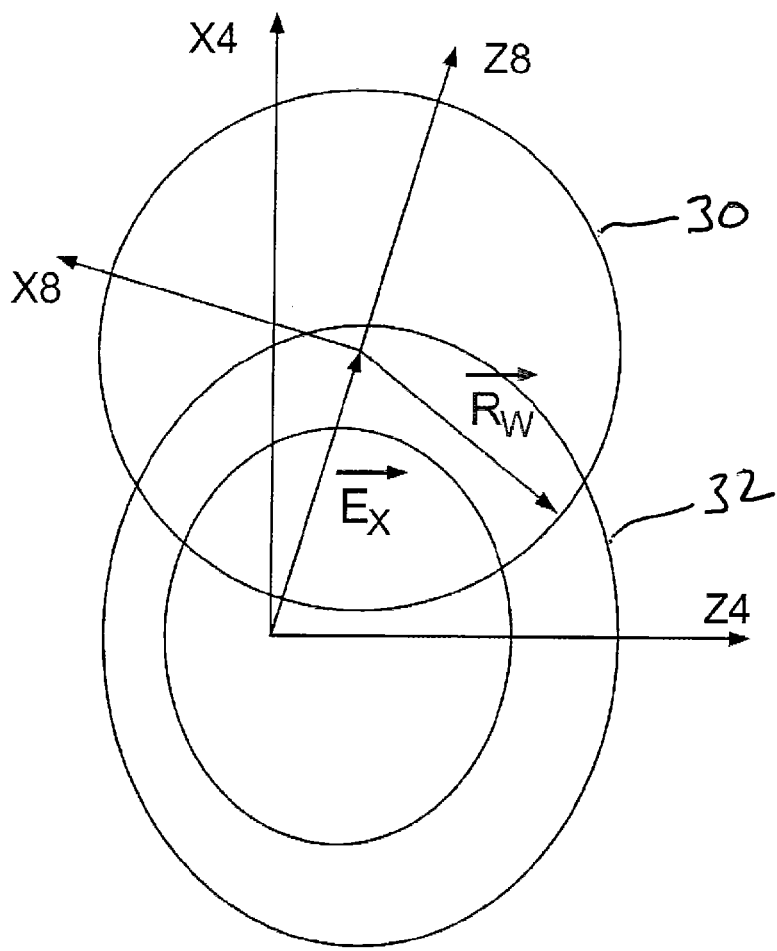
FIG. 5a shows a two dimensional front view of tool and work orientation of the initial settings for forming a slot of a non-generated gear.

FIG. 5a shows a two dimensional front view of tool 30 and work 32 orientation of the initial non-generated settings. The coordinate system X4, Z4 is the generating system, representing the generating plane. The Y4 axis in located at the crossing point of X4 and Z4 and is perpendicular to the drawing plane, pointing at the observer. The center of the tool is located at the crossing point of the axis X8 and Z8. The tool tip trace is in the generating plane and therefore is visible as an undistorted circle. The zone of engagement between tool and work is above the center of the X4-Z4 system.

Figure 5B:
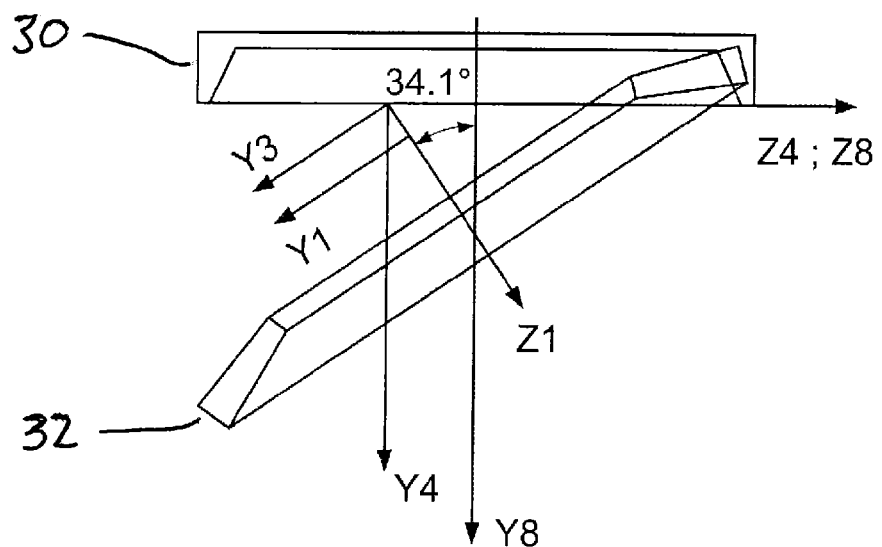

FIG. 5b shows a two dimensional top view of the non-generated setup of the tool 30 and work 32 shown in FIG. 5a. Z1 is the axis of rotation of the work. The angle between the Z1 axis and the Z4 axis is the so-called machine root angle. The non-generated setup cannot generate a gear, but it can position a tool with its axis in any possible configuration to the work axis with a tool axis which is strictly perpendicular to the generating plane X4-Z4. This configuration uses the least amount of parameters (settings) to express a machine setup in a single valued manor. This setup can be used only for non-generated bevel gear manufacturing. Any roll motion (tool with its center X8-Z8 rotates around the generating plane axis (crossing between X4 and Z4)) will mutilate the gear flanks and form non-usable teeth.

Figure 6A:
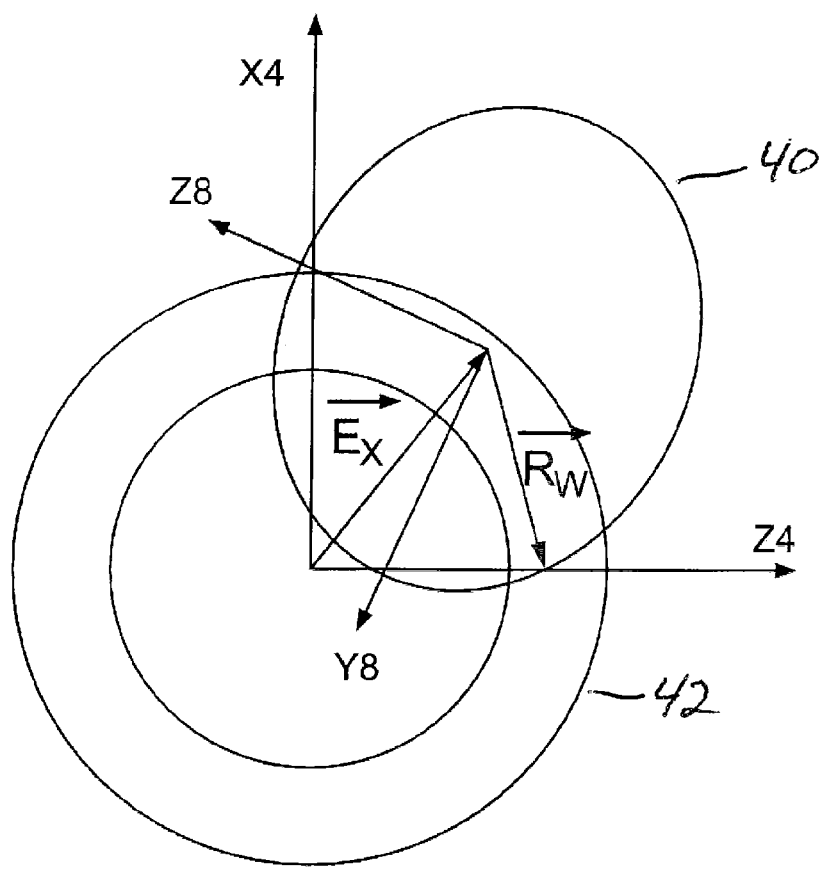
FIG. 6a shows a two dimensional front view of tool and work orientation of the generated (form-rolling) setup which will create the identical flank form as the setup in FIGS. 5a and 5b.

FIG. 6a shows a two dimensional front view of tool 40 and work 42 orientation of the generated (form-rolling) setup, which will create the identical flank form as the setup in FIGS. 5a and 5b. In order to establish the form-rolling configuration work and tool are rotated around the X4 axis until the work axis Z1 matches the generating plane axis Y4. After this first rotation, a second rotation around the work axis Z1 is required in order to have the tool tip trace cross the Z4 axis in the center of the face width of the gear tooth. The tip trace of the tool is now not in a plane anymore which is equidistant to the X4-Z4 plane which is why it appears elliptical in the view in FIG. 6a. The zone of engagement between tool and work is therewith changed from the "above center" (Z4 axis) to an "at center" position.

Figure 6B:
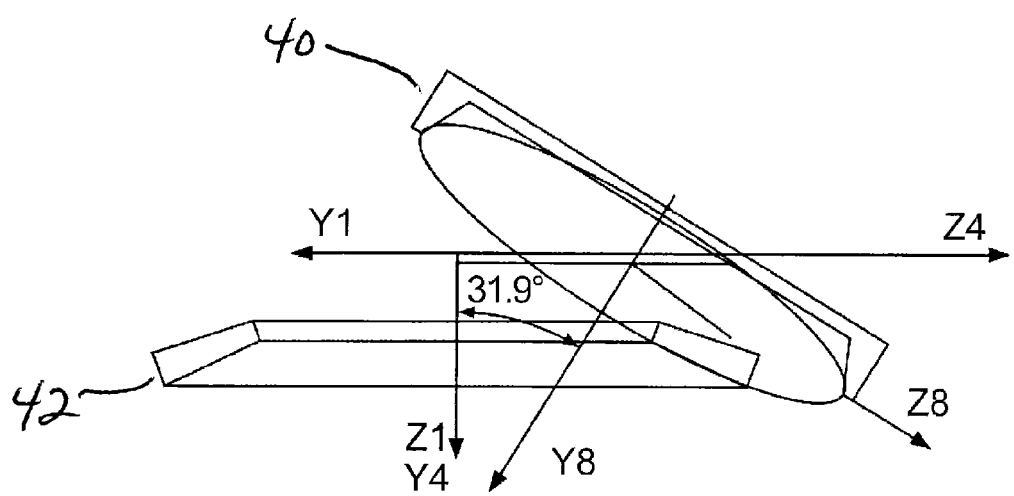
FIG. 6b shows a two dimensional top view of tool and work orientation shown in FIG. 6a. In this view, the work axis is identical with the Y4 axis of the coordinate system which is the axis of the generating gear.

FIG. 6b shows a two dimensional top view of tool 40 and work 42 orientation shown in FIG. 6a. In this view, the work axis Z1 is identical with the Y4 axis of the coordinate system which is the axis of the generating gear. The tool tip trace also in this view appears elliptical, where the section of the ellipse within the face width approximates the direction and position of the tooth root line.

Figure 7A:
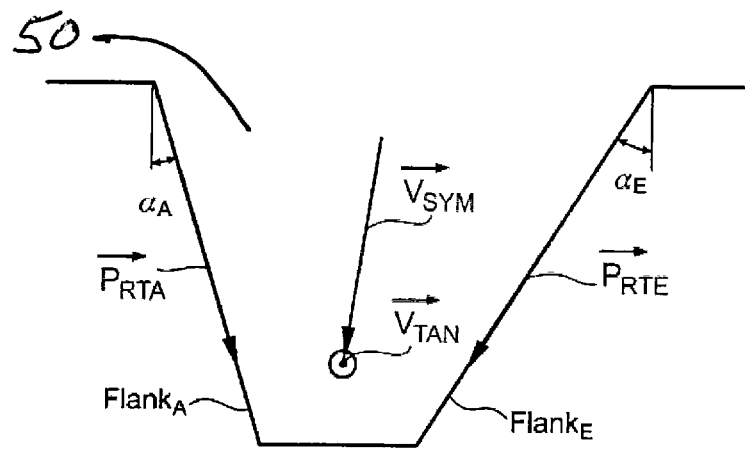
FIG. 7a shows a two dimensional schematic view of an asymmetric gear slot with the profile tangent vectors and the symmetry vector.

FIG. 7a shows a two dimensional schematic view of an asymmetric gear slot 50 with the profile tangent vectors $P_{RTA}$ on the convex flank ($Flank_A$) and $P_{RTE}$ on the concave flank ($Flank_E$) and the symmetry vector $V_{SYM}$ drawn in the middle of the slot as the vector which averages the two profile tangent vectors. The pressure angle of the convex flank is $\alpha_A$ and the pressure angle of the concave flank is $\alpha_E$. The flank line tangent vector VTAN which is calculated as the cross product of the two profile tangent vectors is indicated with a small circle and center dot, which is the mathematical convention for a vector which is perpendicular to the drawing plane pointing at the observer.

Figure 7B:
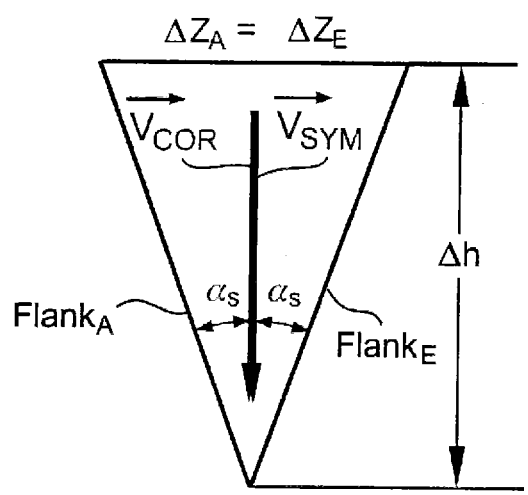
FIG. 7b shows a two dimensional view of the symmetry vector (together with the flanks) rotated into the vertical direction and the two flanks moved together in order to form an equal sided triangle. The two end relief amounts $\Delta Z_A$ and $\Delta Z_E$ have to be accommodated with the orientation of the swing plane.

FIG. 7b shows a two dimensional view of the symmetry vector (together with the flanks) rotated into the vertical direction and the two flanks moved together in order to form an equal sided triangle. The pressure angles relative to the symmetry vector are $\alpha_s$ on both flanks. The two end relief amounts $\Delta Z_A$ and $\Delta Z_E$ are equal in this example and are realized with a swing movement which lowers the tool in $\Delta h$ direction. This is realized with a swing rotation in a plane which is perpendicular to the drawing plane and oriented in $V_{COR}$ direction. $V_{COR}$ is in this case identical to $V_{SYM}$, such that the swing move in the described plane will generate equal amounts of end relief on both flanks.

Figure 7C:
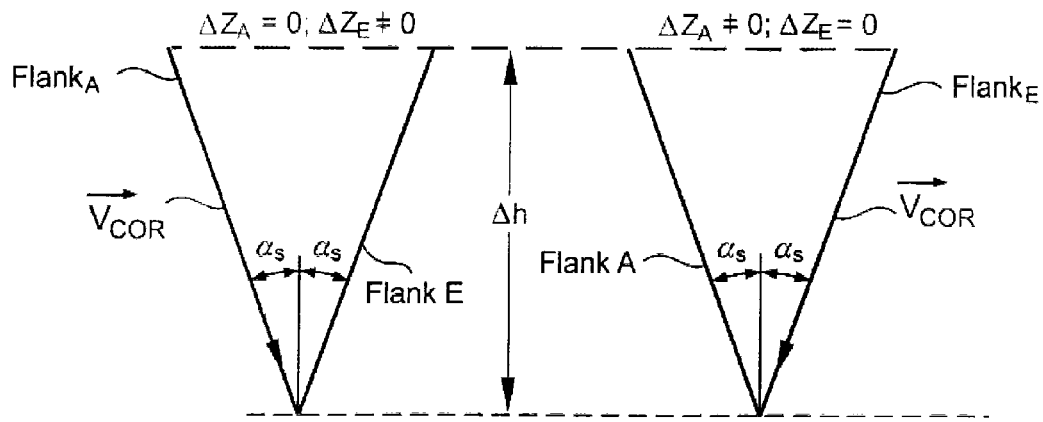
FIG. 7c shows the orientation of the correction vector in the two extreme cases of $\Delta Z_A=0$ and $\Delta Z_E \neq 0$ and of $\Delta Z_A \neq 0$ and $\Delta Z_E=0$.

FIG. 7c shows the orientation of the correction vector in the two extreme cases of $\Delta Z_A=0$ and $\Delta Z_E \neq 0$ and of $\Delta Z_A \neq 0$ and $\Delta Z_E=0$. The vector $V_{COR}$ is rotated from the position of the symmetry vector $V_{SYM}$ by $\alpha_s$ to the flank which should not be relieved. This provides an effect of $2 \times \alpha_s$ for the sideways movement towards the flank that should be relieved.

Figure 8:
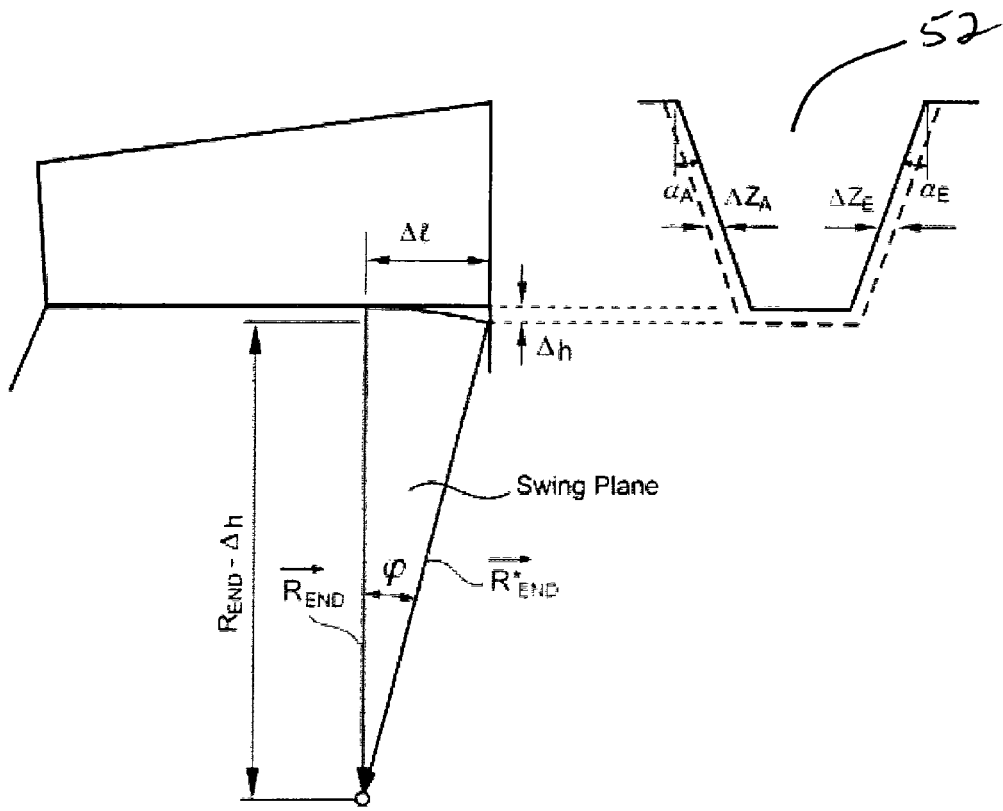
FIG. 8 shows the projected side view of a slot with the correction amount $\Delta h$, the correction radius $R_{END}$ and the swing angle $\phi$. It also shows a front view onto the slot with the example of symmetric pressure angles and an equal end relief amount on both flanks.

FIG. 8 shows in the left part the projected side view of a tooth slot 52 with the correction (end relief) length amount $\Delta l$, depth amount $\Delta h$, the correction radius $IR_{END}I$ (which is the scalar magnitude of the vector $R_{END}$ and the swing angle $\phi$. $IR_{END}I$ is calculated:

$$IR_{END}I=(\Delta h^2+\Delta l^2)/2\Delta h$$

$\phi$ is calculated with the following equation:

$$\phi=\arcsin\,[IR_{END}I/\Delta l]$$

The right part of FIG. 8 shows a front view onto the slot with the example of symmetric pressure angles and an equal end relief amount on both flanks.

Figure 9:
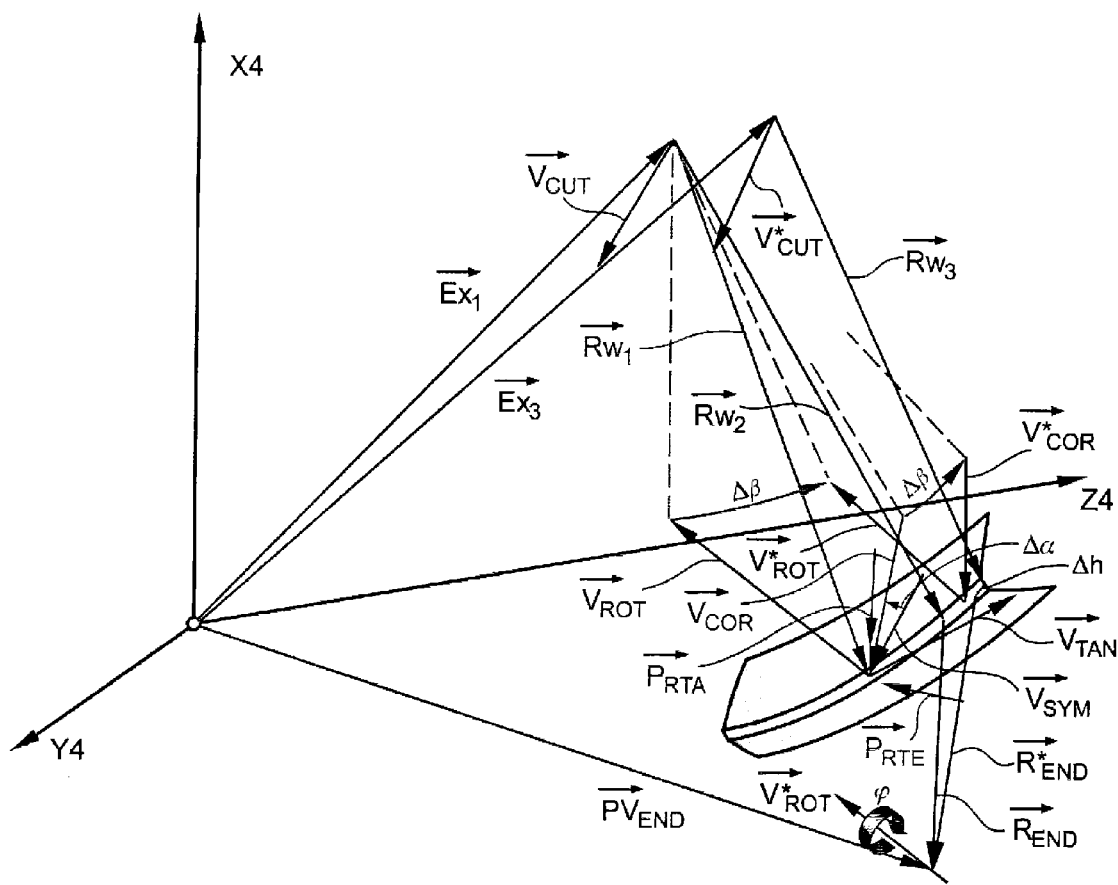
FIG. 9 shows a three dimensional diagram with all vectors involved in the end relief swing rotation.

FIG. 9 shows a three dimensional diagram of the vectors involved in the end relief swing rotation. The X4, Y4, Z4 coordinate system is the generating system with Y4 as the generating gear axis. The vector $E_{X1}$ positions the center of the cutting tool in the position graphically defined in FIGS. 6a and 6b. $R_{W1}$ is the radius vector from the center of the tool to the tip circle (at the mid face position of the gear slot). The vectors $P_{RTA}$ and $P_{RTE}$ are first calculated in the mid-face position with their tip pointing at the tip of $R_{W1}$. $V_{SYM}$ and $V_{COR}$ are calculated as described before and also placed with their tip at the tip location of $R_{W1}$. The calculation of the flank line tangent vector was also described before; it is placed with its end at the tip location of $R_{W1}$. The swing rotation axis (vector $V_{ROT}$) is calculated as:

$$V_{ROT}=V_{TAN} \times V_{COR}$$

After the above calculation, $V_{ROT}$ and $V_{COR}$ have to be rotated about $\Delta \beta$ (the angle between mid-face and the center of the relief section) around the tool axis $Y_{CUT}$ and become $V^*_{ROT}$ and $V^*_{COR}$. The tool radius vector $R_{W1}$ is rotated also around the tool axis by an angle which positions the tool tip at the beginning of the relief section ($R_{W1}$ becomes $R_{W2}$). Then the swing vector $R_{END}$ is calculated by:

$$R_{END}=IR_{END}I^*V_{COR}$$

The location for the relief swing rotation is found by:

$$PV_{END}=E_{X1}+R_{W2}+R_{END}$$

The swing rotation vector $V^*_{ROT}$ is now positioned at the tip of $PV_{END}$ and the connected vectors $R_{END}$ and $R_{W2}$ as well as the cutter axis vector $V_{CUT}$ are rotated together about $\phi$ from the start swing to the end swing position around the $V^*_{ROT}$ axis, which is fixed at the tip of vector $PV_{END}$. This rotation is mathematically expressed in the rotation matrix $(ROT\phi)_{VROT}$. The results are the final vectors $R^*_{END}$, $R_{W3}$ and $V^*_{CUT}$. The basic machine setup is sufficiently defined with the location of the tool center $E_{X3}$ and the tool axis direction vector $Y^*_{CUT}$ after the end relief swing:

$$E_{X3}=P_{VEND}-[R_{END}+R_{W2}] \times (ROT\phi)_{VROT}$$

$$V^*_{CUT}=(ROT\phi)_{VROT} \times V_{CUT}$$

Figure 10A:
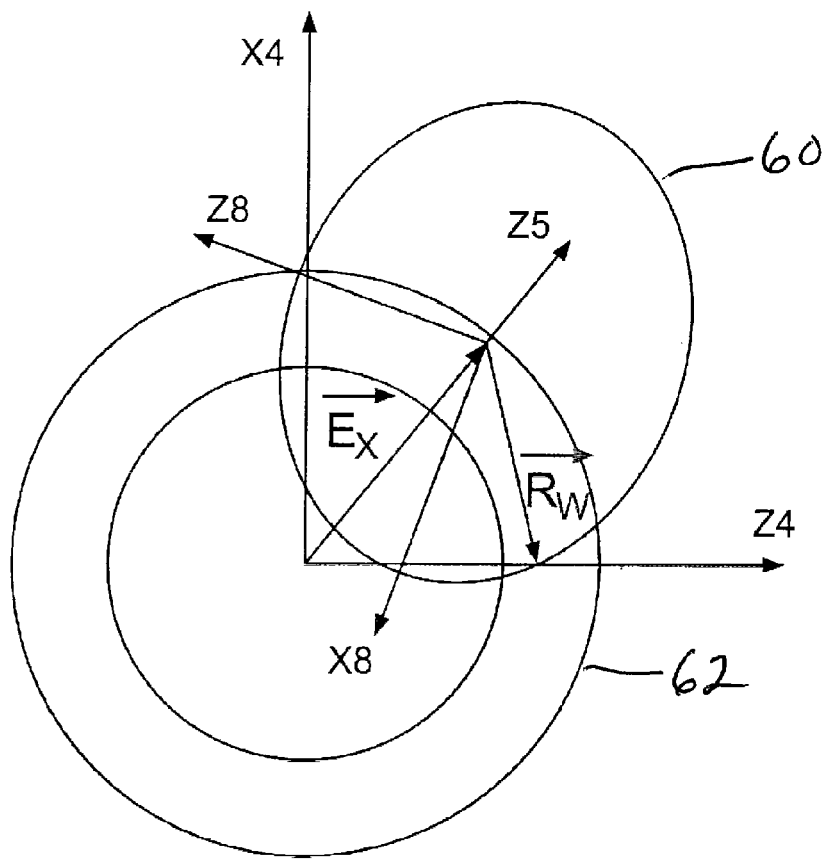
FIG. 10a shows a two dimensional front view of tool and work orientation of the final form-rolling settings after the end relief swing.

FIG. 10a shows a two dimensional front view of tool 60 and work 62 orientation of the final form-rolling settings after the end relief swing. The relief amount used to generate this graphic was 0.2 mm on the convex gear flank (coast side) along a relief section of 25% of the angular gear face. Even a large relief of 0.2 mm causes no noticeable change in this view compared to FIG. 6a.

Figure 10B:
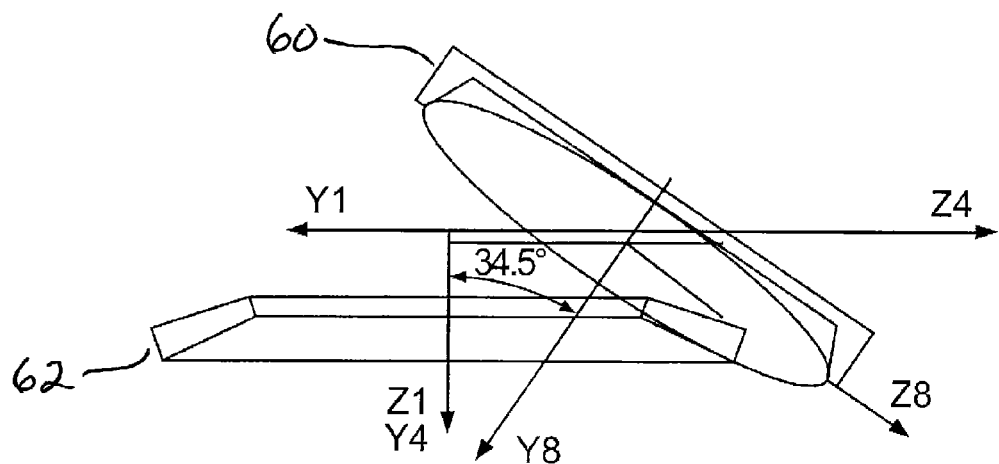

FIG. 10b shows a two dimensional top view of tool 60 and work 62 orientation of the final form-rolling settings after the end relief swing. The relief amount used to generate this graphic was 0.2 mm on the convex gear flank (coast side) along a relief section of 25% of the angular gear face. The indicated angle between the tool axis Y8 (projected vector $V_{CUT}*$) and the Z1 axis (work axis) is 34.5° versus 31.9° before the end relief swing in FIG. 6b (2.6° change of tool axis versus work around the axis X4).

Figure 11A:
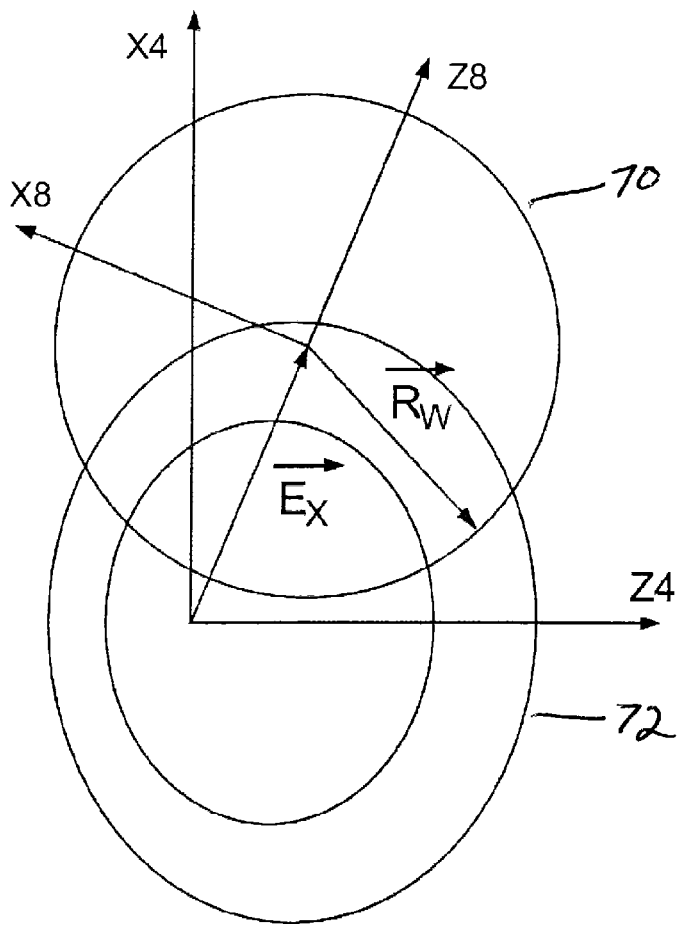
FIG. 11a shows a two dimensional front view of tool and work orientation of the final non-generating settings after the end relief swing.

FIG. 11a shows a two dimensional front view of tool 70 and work 72 orientation of the final non-generating settings after the end relief swing. In the non-generating settings, the tool tip trace lies in the X4-Z4 plane and represents a circle. Changes versus FIG. 6a are optically not noticeable.

Figure 11B:
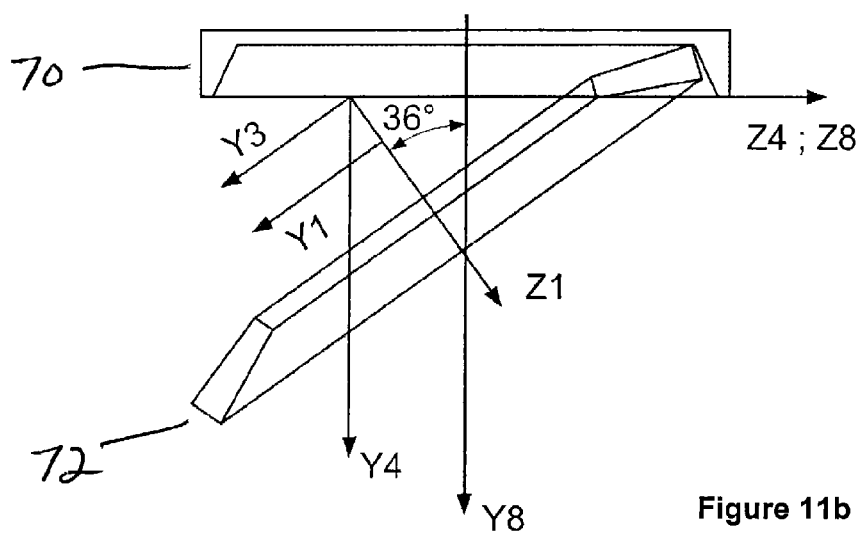

FIG. 11b shows a two dimensional top view of tool 70 and work 72 shown in FIG. 11a. The indicated angle between the tool axis Y8 (which lies in the non-generating setup in the drawing plane Y4-Z4 and is therefore identical to the tool axis vector $V^*_{CUT}$) and the Z1 axis (work axis in the plane Y4-Z4) is 36° versus 34.1° before the end relief swing in FIG. 5b (1.9° change of tool axis versus work around the axis X4). There are additional changes which are optically not noticeable. The extremely small change of the machine settings for a rather large end relief amount shows the high effectiveness of the inventive relief method. It also shows that such small machine movements only require a small amount of additional machining time. For example, a realistic machine root angle movement of 40 degrees/second would require 48 milliseconds additional machining time.

Figure 12A:
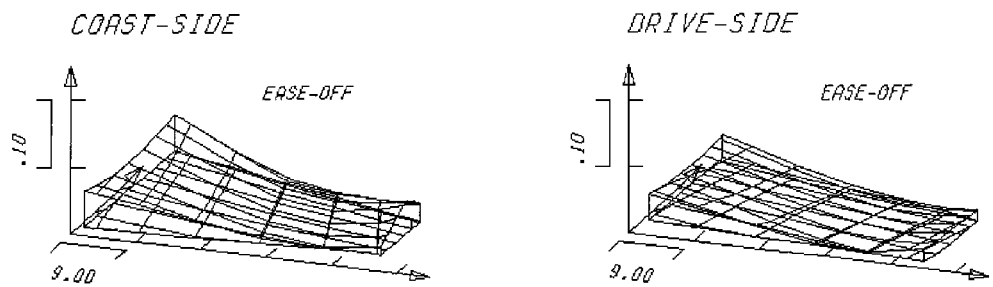
FIG. 12a shows the initial Ease-Offs of coast and drive side of a sample calculation.

FIG. 12a shows the initial Ease-Offs of coast and drive side of a sample calculation. The bend surface above the trimetric projection of the presentation plane represents the crowning in length and profile direction. One increment in length and profile direction is equal to 9 mm. One increment in vertical direction (ease-Off direction) is equal to 0.1 mm.

Figure 12B:
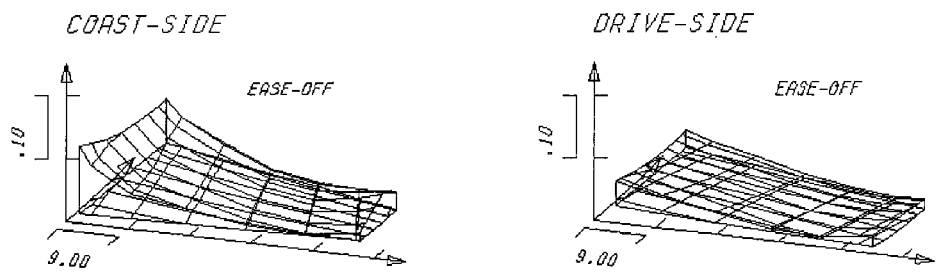
FIG. 12b shows the Ease-Offs of coast and drive side with a 0.05 mm heel end relief on the coast side.

FIG. 12b shows the Ease-Offs of coast and drive side with a 0.05 mm heel end relief on the coast side. This relief is visible as increase of Ease-Off in a section (left in the coast side Ease-Off graphic) which has a length of 25% of the projected length of the tooth. Small side effects in the range of 0.005 mm can be noticed on the drive side Ease-Off in comparison to FIG. 12a. The side effect can be eliminated by a small increase of the rotation angle $\Delta \alpha$ in FIG. 9.

Figure 12C:
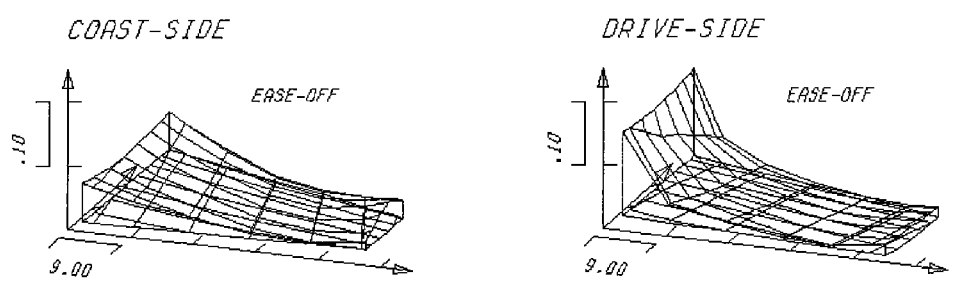
FIG. 12c shows the Ease-Offs of coast and drive side with a 0.1 mm heel end relief on the drive side

FIG. 12c shows the Ease-Offs of coast and drive side with a 0.1 mm heel end relief on the drive side. This relief is visible as increase of ease-Off in a section (left in the drive side ease-Off graphic) which has a length of 25% of the projected length of the tooth. There are no side effects on the ease-Off of the un-corrected coast side (compared to the initial coast side Ease-Off in FIG. 12a).

FIG. 12d shows the Ease-Offs of coast and drive side with a 0.1 mm heel end relief on the coast side and a 0.05 mm heel end relief on the drive side. This relief is visible as increase of Ease-Off in a section (left in the coast side and drive side Ease-Off graphics) which has a length of 25% of the projected length of the tooth. Magnitude and length of the end relief can be controlled with the parameters $\Delta Z_A$, $\Delta Z_E$ and $\Delta l$ FIG. 13 shows the summary section with additional items for a cutting or grinding machine to realize an end relief swing which reliefs the drive side flanks at the heel by 0.1 mm (as shown in FIG. 12c). The summary in FIG. 13 contains only second order coefficients. Second order end reliefs connect the base flank surface and the relief section smooth without steps or nicks. First and higher order and combinations thereof are also possible.

Summary item 56 is the position of a virtual tool radius vector at the start swing position ($R_{W2}$ in FIG. 9). Item 58 is the virtual tool radius vector position at the end of the swing motion. This position can be equal or larger than the position at the heel boundary. Item 59 is the angular velocity at which the virtual tool radius vector rotates through the relief section.

Items ER1 through ER19 are the coefficients that change the non-generating settings during the relief motion with polynomials which are preferably written like a Taylor series development. For example the coefficients ER17 through ER19 change the machine root angle $\Gamma_M$ according to the following calculation which is performed in the machine control computer:

$$\Gamma_M = \Gamma_{M0} + VM1^*(\phi_{TOOL-i} - \phi_{TOOL-START})/1! + VM2^* (\phi_{TOOL-i} - \phi_{TOOL-START})^2/2! + VM3^*(\phi_{TOOL-i} - \phi_{TOOL-START})^3/3! + VM4^*(\phi_{TOOL-i} - \phi_{TOOL-START})/4!$$

Where:
$\Gamma_M$ . . . Machine root angle
$\Gamma_{M0}$ . . . Basic machine root angle
VM1 . . . Item ER17 of summary
VM2 . . . Item ER18 of summary
VM3 . . . Item ER19 of summary
$\phi_{TOOL-START}$ . . . Item 56 of summary
$\phi_{TOOL-i}$ . . . Actual swing position of virtual tool radius vector The changes of all other machine settings such as work rotation phase angle $\phi_A$, vertical position of tool center V, horizontal position of tool center H and axial work position MCCP are calculated analogous to the machine root angle $\Gamma_M$.

The two items in the end relief swing summary numbered 69 and 70 are two angles in the tool coordinate system that define the relative withdraw direction after the end relief swing. To withdraw in the correct direction is critical because the wrong path, to remove the tool from the slot could cause secondary cuts or mutilations of the finish machined flanks.

The inventors discovered a method to utilize the form-rolling settings with its freedoms in order to calculate a set of motions which superimpose the form-rolling settings during the manufacturing process of a non-generated gear in order to achieve a smooth connection of a non-generated main flank with an end relief. The inventors have found a solution to convert the generating motions into V-H motions without losing the work phase angle relationship comprising the following steps:

Establish form-rolling settings in vector and matrix notation from the initial non-generated settings.

Convert in an auxiliary calculation the new form-rolling settings back to non-generated settings and calculate a reference work phase angle.

Determine a swing axis and a position vector which locates the rotation axis such that the tool (cutter or grinding wheel) if it swings (rotates) around this axis will form the desired relief on one or both flank surfaces (from the starting line in the flank(s) to the tooth boundary, removing the desired relief amount and also in order to avoid secondary (flank damaging) material removal during the relive rotation.

Swing tool from the initial form-rolling position to the final end-relief position.

Calculate form-rolling settings in vector and matrix notation in the final end relief position.

Conversion of form rolling settings into non-generated settings.

Calculation of work phase angle in final end relief position.

Calculation of delta settings (non-generated settings after end relief move minus non-generated settings before end relief move). The delta value of the work phase angle is calculated from the work phase angle in the end swing position minus the work phase angle from the auxiliary calculation (after the non-generated settings were already converted to form-rolling settings).

Calculate motion coefficients (preferably of the second order) to connect the "before" and "after" settings. Those coefficients apply to the four V-H basic setting and the additional work rotation. The lead function can be the time.

The inventors further discovered that the requirements of independent end relief on the convex and concave flank in connection with the avoidance of secondary flank damaging contact can be achieved if the swing axis is calculated from the profile tangent vectors located in the center of the relief section. The arithmetic average of the single components of the flank profile tangent vectors results in the slot symmetry vector. The cross product of the profile tangent vectors delivers the tooth lead tangent vector. The slot symmetry vector has to be rotated around the flank lead tangent if flanks are relieved with different amounts. The rotation can be determined to create no relief on one flank and a desired relief on the opposite flank. In order to interrupt any flank contact on the flank which should not be relieved, it is possible to rotate the slot symmetry vector beyond the angle of zero relief. The result of a symmetry vector rotation is the correction vector. The correction vector is multiplied with a radius value (which results from the required relief within the chosen relief section length) resulting in the end relief radius vector. The end relief radius vector is then connected with its end to the virtual tool tip, after the virtual tool tip (being oriented at the mean face position in the basic settings of non-generating and form-rolling) is rotated around the tool axis to the start position of the end relief. The swing axis is calculated by the cross product between the correction vector and the flank line tangent vector (based on the center of the relief section) and then located at the tip of the end relief vector.

During the virtual tool rotation from relief section begin to the relief section end (with possible over travel amount) the swing axis rotates the end relief radius vector together with the virtual tool radius vector in a different position. The new location of the tool center and the new cutter axis vector allows the calculation of new form rolling basic settings. During the swing rotation, the work remains in a fixed position in space, without translational or rotational moves. The entire relief motions are based on the fixed gear. The conversion of the before and after vectors and matrices to non-generated (V-H) settings will reduce the number of moving settings but those settings will include a corrective work rotation about a work rotation phase angle.

The swing angle can be calculated such that the tool is not in contact with the work or it can be determined such that at the end of the swing some small contact at the tooth boundary still exists. In either case, the tool is withdrawn along a defined path in order to avoid additional flank contact of the tool. This withdrawal path, straight or circular should be directed at the beginning in the opposite direction of $R_{END}^*$. After a small first move which places the tool tip outside of the slot, the fastest possible move to the initial position, before plunging the next slot is desired.

The non-generated plunging uses a dwell time at the end of the plunge in order to allow for "free cutting" or "out sparking" before the tool withdraws. The withdraw direction generally is along the same vector (or circular path) but opposite in direction than the plunge direction. In case of a desired end relief, the swing motion can start after the dwell time (may even allow a reduction the dwell time) and seamlessly end in a rapid withdrawal (first part in the direction $-R_{END}*$ and second part in the direction of the required start position for plunging the next slot). An additional dwell time after the end relief swing is not required. The additional machining time if an end relief is created is in the vicinity of 25% or less of the original plunging and dwell time While the invention has been discussed with regard to face milling, it is not limited thereto. Face hobbing (continuous indexing) methods may likewise realize the benefits of the invention. Additionally, the inventive method may be practiced to create a chamfer and/or remove burrs at the end of a tooth. The invention enables a short machining time due to integrated swing motion between non-generating plunge and withdraw.

The invention provides for the ability to take advantage of all generating freedoms due to the conversion to form-rolling and back conversion to non-generating settings. Thus, the inventive method is capable of being continually represented as a non-generated process with V-H settings during the formation of the main tooth surface and the end relief. While the work phase angle is lost in the conversion from and to V-H settings, the invention with its auxiliary calculation produces a correct work phase angle. Also, secondary cuts and interferences are avoided by choosing the reference cross section for the correction vector and rotation vector in the center of the relief section.

Although the invention has been described in terms of converting non-generating settings to form-rolling settings and then converting back to non-generating settings for the machining of the end relief, the invention is not limited thereto. The method may be performed entirely with form-rolling (generating) settings for a non-generated gear, or, may be performed entirely with V-H settings without the conversion and back conversion as described above. As stated, the method may also be utilized to perform chamfering and/or deburring operations on a workpiece.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining a bevel gear workpiece with a tool to form a plurality of tooth surfaces on said workpiece with each of said tooth surfaces having a predetermined length, said method comprising:
    engaging said workpiece and said tool,
    feeding said tool relative to said workpiece to a predetermined depth in said workpiece thereby forming a tooth slot and defining adjacent tooth surfaces,
    moving said tool relative to said workpiece whereby an end relief section is formed by said tool at one end of at least one of said adjacent tooth surfaces, said moving of said tool being an angular swing motion ($\phi$) defined by pivoting said tool about a swing pivot axis, said swing pivot axis being located dependent upon the length ($\Delta l$) and depth ($\Delta h$) of said end relief section,
    wherein said moving additionally includes a rotation of said workpiece about a work rotation phase angle,
    withdrawing said tool from the tooth slot.

2. The method of claim 1 wherein said moving and said withdrawing are performed substantially simultaneously with one another.

3. The method of claim 1 wherein said method is defined in terms of non-generating V-H basic settings.

4. The method of claim 1 wherein said moving is defined in terms of generating basic settings with said generating basic settings being converted to non-generating V-H basic settings.

5. The method of claim 1 wherein said tool is a cutting tool.

6. The method of claim 1 wherein said tool is a grinding tool.

7. The method of claim 1 wherein said machining is face milling.

8. The method of claim 1 wherein said machining is face hobbing.

9. The method of claim 1 further comprising chamfering and/or deburring of said workpiece with said tool during said moving along said angular swing motion.

* * * * *